United States Patent
Kollias et al.

(10) Patent No.: US 11,885,705 B2
(45) Date of Patent: Jan. 30, 2024

(54) FULLY DIFFERENTIAL CAPACITIVE PRESSURE SENSOR INCLUDING STACKED SENSOR AND REFERENCE CAPACITORS

(71) Applicant: Infineon Technologies AG, Neubiberg (DE)

(72) Inventors: Athanasios Kollias, Munich (DE); Bernhard Winkler, Lappersdorf (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/816,817

(22) Filed: Aug. 2, 2022

(65) Prior Publication Data

US 2023/0054356 A1    Feb. 23, 2023

(30) Foreign Application Priority Data

Aug. 25, 2021  (EP) ..................................... 21192953
Oct. 18, 2021  (EP) ..................................... 21203290

(51) Int. Cl.
*G01L 9/00*    (2006.01)

(52) U.S. Cl.
CPC .......... *G01L 9/0073* (2013.01); *G01L 9/0045* (2013.01)

(58) Field of Classification Search
None
See application file for complete search history.

(56) References Cited

U.S. PATENT DOCUMENTS

| | | | |
|---|---|---|---|
| 9,181,080 B2 * | 11/2015 | Dehe .......................... | H04R 7/02 |
| 2010/0170346 A1 * | 7/2010 | Opitz ..................... | B81B 3/0078 |
| | | | 73/718 |
| 2013/0319125 A1 * | 12/2013 | Wang ..................... | G01L 9/0045 |
| | | | 331/154 |
| 2015/0061049 A1 * | 3/2015 | Weber ............... | H01L 29/66007 |
| | | | 257/417 |
| 2016/0223579 A1 * | 8/2016 | Froemel ................. | G01L 9/0054 |
| 2018/0335359 A1 * | 11/2018 | Eckinger ............... | B81B 3/0021 |

FOREIGN PATENT DOCUMENTS

DE      102009000056 A1      7/2010

* cited by examiner

*Primary Examiner* — Brandi N Hopkins
*Assistant Examiner* — Nigel H Plumb
(74) *Attorney, Agent, or Firm* — Slater Matsil, LLP

(57) ABSTRACT

Pressure sensors include stacking of sensor capacitors on top of reference capacitors. A pressure cavity may be extended below a bottom electrode. The pressure sensors may include a mechanical link of a top membrane with the bottom electrode in order to form a dual membrane, or a mechanical link of the top membrane, the bottom electrode and an intermediate electrode within a cavity. A pressure sensor includes a first and second pressure sensing portions, each including a first and second rigid electrodes, and a deflectable membrane structure. The second rigid electrode is between the first rigid electrode and the deflectable membrane structure arranged in a vertical configuration. The first and second rigid electrodes of the first and second pressure sensing portions form respective reference capacitors, and the second rigid electrodes and the deflectable membrane structures form respective sensing capacitors.

15 Claims, 8 Drawing Sheets

| parameter | scale down factor |
|---|---|
| area | 1/2 |
| rel. sensitivity | 1 |
| pressure nonlinearity | 1 |

| parameter | scale down factor |
|---|---|
| area | 1/2 |
| rel. sensitivity | 2x |
| pressure nonlinearity | 1/5 |

| parameter | optimization in area | optimization in sensitiivity |
|---|---|---|
| area | 1/4 | 1/2 |
| rel. sensitivity | 2x | 4x |
| pressure nonlinearity | 1/5 | 1/5 |

FULLY DIFFERENTIAL CAPACITIVE PRESSURE SENSOR INCLUDING STACKED SENSOR AND REFERENCE CAPACITORS

This application claims the benefit of European Patent Application Nos. 21192953, filed Aug. 25, 2021 and U.S. Pat. No. 21,203,290, filed Oct. 18, 2021 which applications are hereby incorporated herein by reference.

TECHNICAL FIELD

Embodiments of the present disclosure relate to a capacitive pressure sensor arrangement, such as a capacitive MEMS pressure arrangement (MEMS=microelectromechanical system) for implementing differential capacitive pressure sensor concept. More specifically, embodiments relate to a fully differential capacitive pressure sensor concept.

The present sensor concept is related to a capacitive pressure sensor arrangement that shows improved technical characteristics in terms of the resulting pressure sensitivity, pressure non-linearity and necessary area occupied. The sensor arrangement comprises or consists of pressure sensitive capacitors interconnected in such a way to form a bridge configuration. Furthermore, a readout circuit can be used to sense the change in capacitance over pressure and temperature.

BACKGROUND

The sensing of environmental parameters in the ambient atmosphere, such as pressure, sound, temperature, etc., with MEMS-based devices gains more and more importance in the implementation of appropriate sensors within mobile devices, home automation, such as smart-home, and the automotive sector.

A current architecture used in MEMS capacitive pressure sensing is based on a capacitive bridge which consists of two sensor capacitors and two reference capacitors, wherein the sensor capacitors and reference capacitors are arranged side by side on a circuit board. The output signal thereof is (relatively) proportional to the sensor capacitance change. Each capacitor (sensor capacitor and reference capacitor) consists of a conductive membrane and a conductive counter electrode that are separated by a cavity. In contrast to the sensor membranes, which are sensitive to the applied pressure, the reference membranes are stiffened with additional layer material to show a negligible sensitivity to the external pressure. The common mode signal is proportional to the capacitance difference between the sensor capacitors and reference capacitors.

However, with this architectural design of a capacitive pressure sensor arrangement, the reference capacitors spend area and are not contributing to the signal output.

Therefore, there is a need in the field of pressure sensors to implement a capacitive pressure sensor arrangement having improved characteristics, e.g., a reduced area, an increased relative sensitivity and/or a reduced pressure non-linearity, when compared to current pressure sensors.

Such a need can be solved by the capacitive MEMS pressure sensor arrangements according to the independent claims.

Further, specific implementations of the capacitive MEMS pressure sensor arrangements are defined in the dependent claims.

SUMMARY

According to an embodiment, a capacitive pressure sensor arrangement comprises a first MEMS pressure sensing portion and a second MEMS pressure sensing portion on a substrate, each comprising a first rigid electrode fixed with respect to the substrate, a second rigid electrode, and a deflectable membrane structure, wherein the second rigid electrode is sandwiched between the first rigid electrode and the deflectable membrane structure, and wherein the first rigid electrode, the second rigid electrode and the deflectable membrane structure are arranged in a vertically spaced configuration, and wherein the first and second rigid electrode of the first MEMS pressure sensing portion form a reference capacitor of the first MEMS pressure sensing portion, and wherein the second rigid electrode and the deflectable membrane structure of the first MEMS pressure sensing portion form a sensing capacitor of the first MEMS pressure sensing portion, and wherein the first and second rigid electrode of the second MEMS pressure sensing portion form a reference capacitor of the second MEMS pressure sensing portion, and wherein the second rigid electrode and the deflectable membrane structure of the second MEMS pressure sensing portion form a sensing capacitor of the second MEMS pressure sensing portion.

According to a further embodiment, a capacitive pressure sensor arrangement comprises a first MEMS pressure sensing portion and a second MEMS pressure sensing portion on a substrate, each comprising: a rigid electrode structure, a first deflectable membrane structure and a second deflectable membrane structure in a vertically spaced configuration, wherein the rigid electrode structure is sandwiched between the first deflectable membrane structure and the second deflectable membrane structure, and wherein the first deflectable membrane structure of the first MEMS pressure sensing portion comprises a deflectable portion and the second deflectable membrane structure of the first MEMS pressure sensing portion comprises a deflectable portion, and wherein the deflectable portions of the first and second membrane structures of the first MEMS pressure sensing portion are mechanically coupled to each other and are mechanically decoupled from the rigid electrode structure, wherein the first deflectable membrane structure of the second MEMS pressure sensing portion comprises a deflectable portion and the second deflectable membrane structure of the second MEMS pressure sensing portion comprises a deflectable portion, and wherein the deflectable portions of the first and second membrane structures of the second MEMS pressure sensing portion are mechanically coupled to each other and are mechanically decoupled from the rigid electrode structure, wherein the first deflectable membrane structure and the rigid electrode structure of the first MEMS pressure sensing portion form a first sensing capacitor, wherein the first rigid electrode structure and the second deflectable membrane structure of the first MEMS pressure sensing portion form a second sensing capacitor, and wherein the first deflectable membrane structure and the rigid electrode structure of the second MEMS pressure sensing portion form a third sensing capacitor, wherein the first rigid electrode structure and the second deflectable membrane structure of the second MEMS pressure sensing portion form a fourth sensing capacitor.

According to a further embodiment, a capacitive pressure sensor arrangement comprises a first rigid electrode structure, a second rigid electrode structure, a first deflectable membrane structure, second deflectable membrane structure and third deflectable membrane structure in a vertically spaced configuration,
  wherein the first rigid electrode structure is sandwiched between the first and second deflectable membrane structure, wherein the second rigid electrode structure is sandwiched between the second and third deflectable membrane structure, wherein the first, second and third deflectable membrane structures each comprise a deflectable portion, wherein the deflectable portions of the first, second and third deflectable membrane elements are mechanically coupled to each other and are mechanically decoupled from the first and second rigid electrode structures, and
  wherein the first deflectable membrane structure and the first rigid electrode structure form a first sensing capacitor, wherein the first rigid electrode structure and the second deflectable membrane structure form a second sensing capacitor, wherein the second deflectable membrane structure and the second rigid electrode structure form a third sensing capacitor, and wherein the second rigid electrode structure and the third deflectable membrane structure form a fourth sensing capacitor.

The present concept for implementing a capacitive MEMS pressure sensor arrangement (for front side sensing) is based on the finding that the sensor capacitors are stacked on top of the reference capacitors and the low pressure cavity is extended below the bottom electrode (of the sensor capacitor).

According to an embodiment, a mechanical link of the top membrane electrode with the bottom membrane electrode may be provided in order to form a dual membrane.

According to a further embodiment, a mechanical link of the top membrane electrode, the bottom membrane electrode and an intermediate membrane electrode may be provided within the cavity.

BRIEF DESCRIPTION OF THE DRAWINGS

In the following, embodiments of the present disclosure are described in more detail with respect to the figures, in which.

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to (or in) the x-y-plane, wherein the term "vertical" means a direction parallel to the z-direction.

Figure 1A:
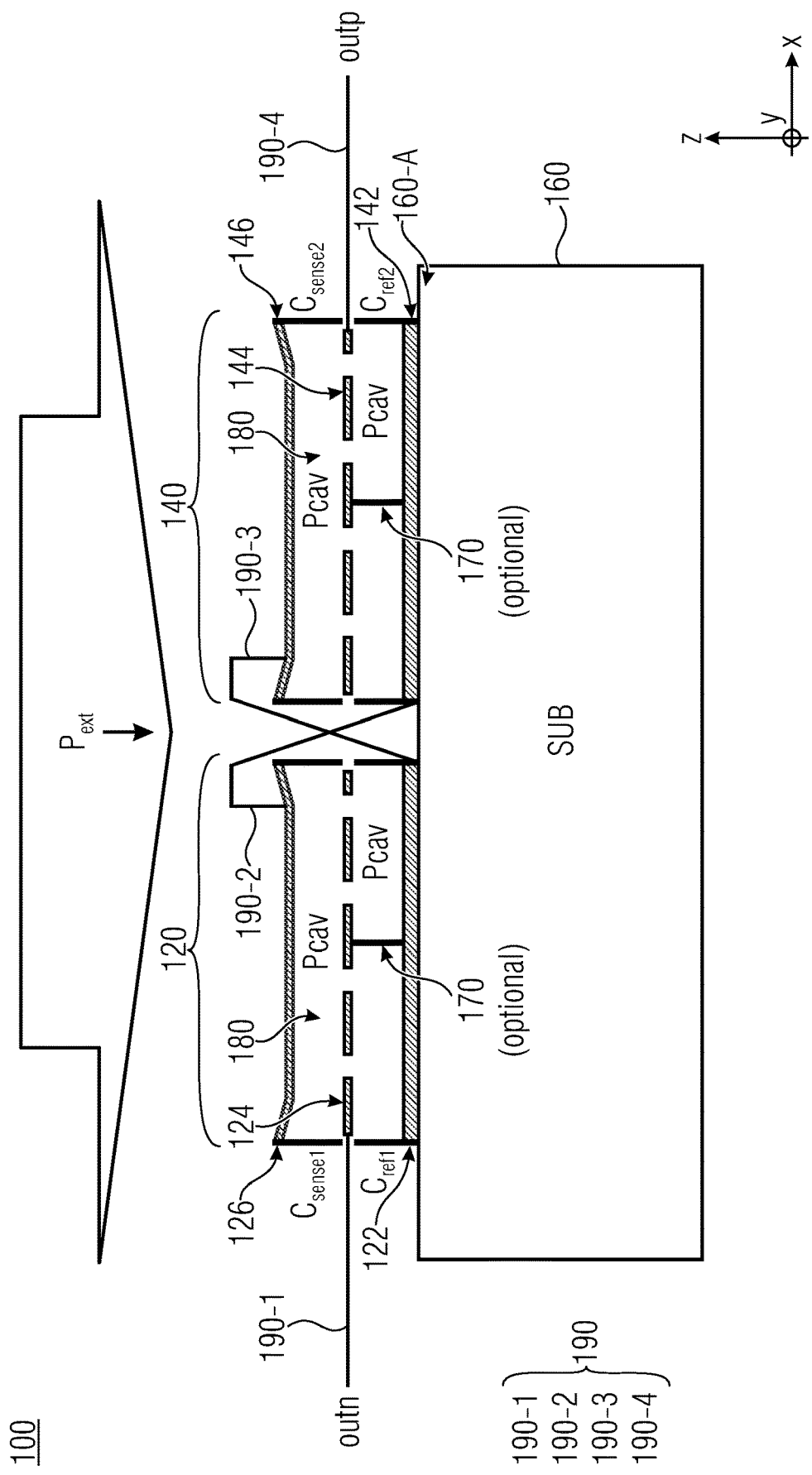
FIGS. 1a-1e show a schematic cross-sectional view of a capacitive MEMS pressure sensor arrangement according to an embodiment, a listing of the resulting parameters of the capacitive MEMS pressure sensor arrangement, possible technical implementations of the capacitive MEMS pressure sensor arrangement, and an equivalent circuit in form of a bridge circuit (Wheatstone bridge)
Figures 1B, 1C:
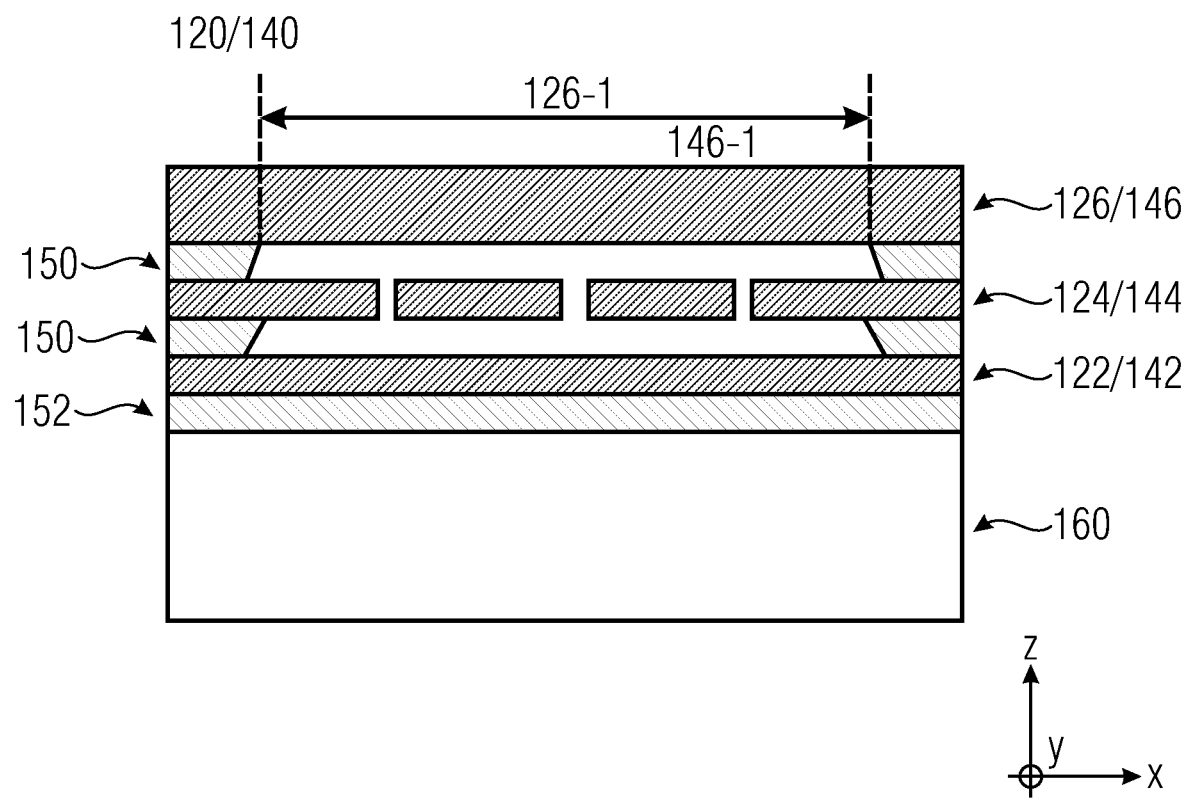
Figure 1D:
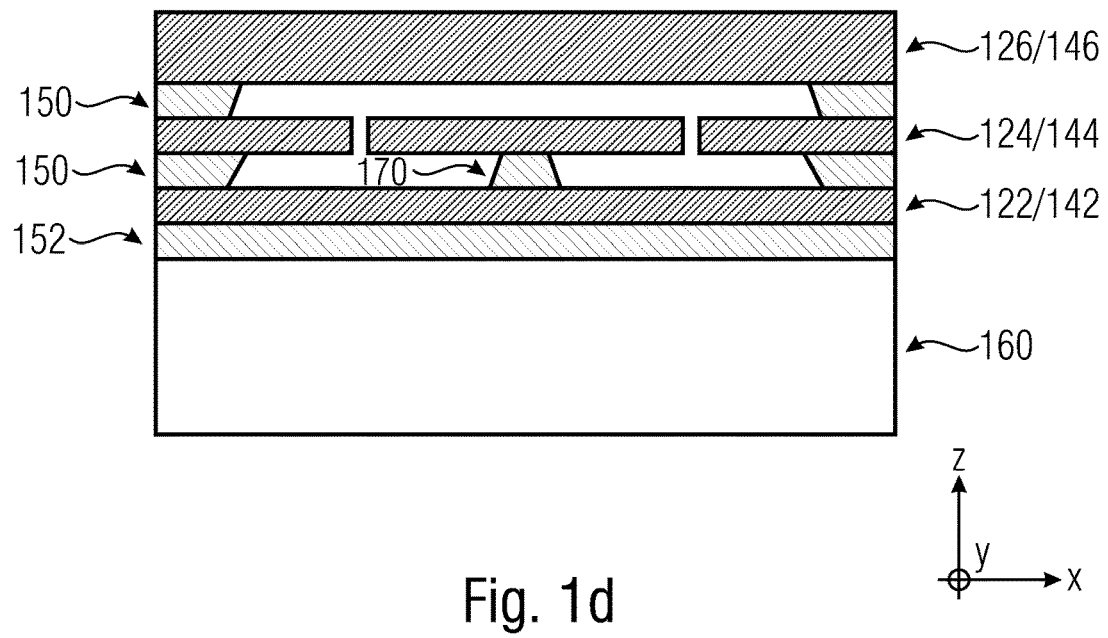
Figure 1E:
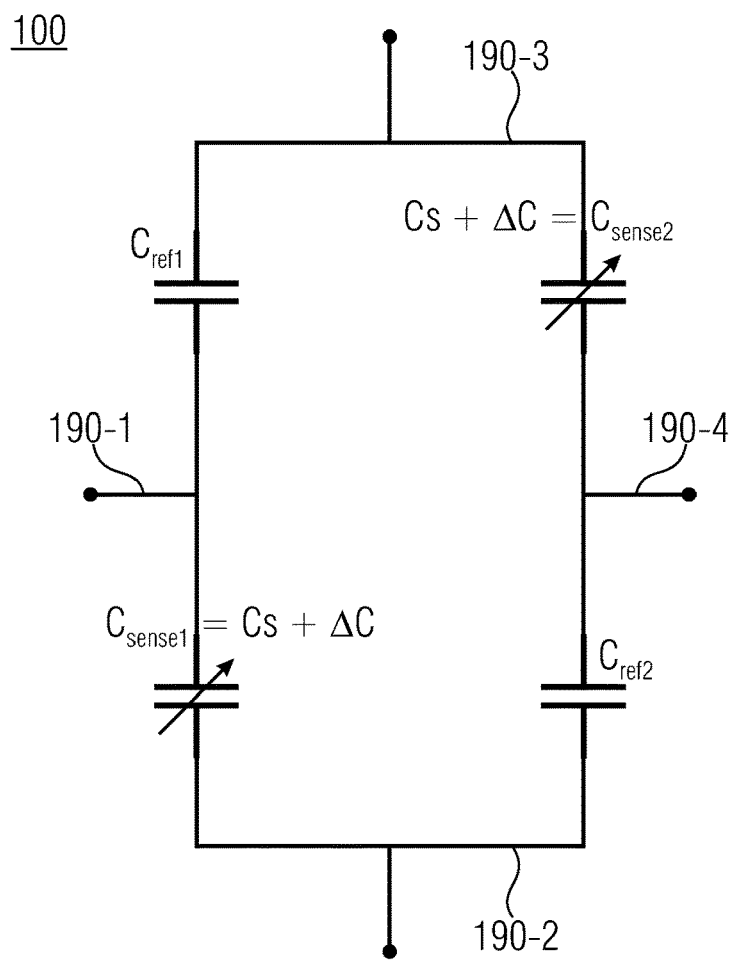

FIG. 1a shows a schematic cross-sectional view of a capacitive (MEMS) pressure sensor arrangement 100 according to an embodiment. FIG. 1b shows a listing of the resulting parameters (technical parameters) of the capacitive MEMS pressure sensor arrangement 100. FIGS. 1c-1d show different possible technical implementations of the capacitive MEMS pressure sensor arrangement 100 FIG. 1e shows an equivalent circuit in form of a bridge circuit (Wheatstone bridge) of the capacitive MEMS pressure sensor arrangement 100.

The schematic cross-sectional views of the pressure sensor arrangement 100 in FIGS. 1a, 1c, and 1d are parallel to the x-z-plane (=vertical plane).

According to an embodiment as shown in FIGS. 1a-1e, the capacitive pressure sensor arrangement 100 (capacitive MEMS pressure sensor arrangement–MEMS=microelectromechanical system) comprises a first MEMS pressure sensing portion 120 and a second MEMS pressure sensing portion 140 on a substrate 160. As shown in FIG. 1a (and in FIGS. 1c-1d), the first and second MEMS pressure sensing portions 120, 140 may be arranged laterally separated and spaced to each other on the substrate 160.

The first MEMS pressure sensing portion 120 comprises a first rigid electrode 122 (in form of a conductive layer or layer structure) fixed with respect to the subset 160, e.g. with respect to a first main surface region 160-A of the substrate 160, a second rigid electrode 124 (in form of a conductive layer or layer structure), and a deflectable membrane structure 126 (in form of a deflectable conductive layer or layer structure). The deflectable membrane structure 126 may be exposed to the environmental atmosphere, i.e. the external pressure $P_{ext}$. The second rigid electrode 124 is sandwiched between the first rigid electrode 122 and the deflectable membrane structure 126, wherein the first rigid electrode 122, the second rigid electrode 124 and the deflectable membrane structure 126 are arranged in a vertically spaced configuration, e.g. in a vertically separated and spaced (stacked) configuration.

The second MEMS pressure sensing portion 140 also comprises a first rigid electrode 142 (in form of a conductive layer or layer structure) fixed with respect to the subset 160, e.g. with respect to a first main surface region 160-A of the substrate 160, a second rigid electrode 144 (in form of a conductive layer or layer structure), and a deflectable membrane structure 146 (in form of a deflectable conductive layer or layer structure). The deflectable membrane structure 146 may be exposed to the environmental atmosphere, i.e. the external pressure $P_{ext}$. The second rigid electrode 144 is sandwiched between the first rigid electrode 142 and the deflectable membrane structure 146, wherein the first rigid electrode 142, the second rigid electrode 144 and the deflectable membrane structure 146 are arranged in a vertically spaced configuration, e.g. in a vertically separated and spaced (stacked) configuration.

Thus, according to the embodiment of FIG. 1a, each of the first and second MEMS pressure sensing portions 120, 140 comprises a first rigid electrode 122, 142 fixed with respect to the substrate 160, a second rigid electrode 124, 144, and a deflectable membrane structure 126, 146, wherein the second rigid electrode 124, 144 is sandwiched between the first rigid electrode 122, 142 and the deflectable membrane structure 126, 146, and wherein the first rigid electrode 122, 142, the second rigid electrode 124, 144 and the deflectable membrane structure 126, 146 are arranged in a vertically spaced configuration.

The first and second rigid electrodes 122, 124 of the first MEMS pressure sensing portion 120 from a reference capacitor $C_{ref1}$ of the first MEMS pressure sensing portion 120 (first reference capacitor $C_{ref1}$), wherein the second rigid electrode 124 and the deflectable membrane structure 126 of the first MEMS pressure sensing portion 120 form a sensing capacitor $C_{sense1}$ of the first MEMS pressure sensing pressure portion 120 (first sensing capacitor $C_{sense1}$).

The first and second rigid electrodes 142, 144 of the second MEMS pressure sensing portion 140 form a reference capacitor $C_{ref2}$ of the second MEMS pressure sensing portion 140 (second reference capacitor $C_{ref2}$), wherein the second rigid electrode 144 and the deflectable membrane structure 146 of the second MEMS pressure sensing portion 140 form a sensing capacitor $C_{sense2}$ of the second MEMS pressure sensing portion 140 (second sensing capacitor $C_{sense2}$).

According to the embodiment of the capacitive MEMS pressure sensor arrangement 100 in FIG. 1a, the necessary area (footprint) of the capacitive MEMS pressure sensor arrangement 100 on the substrate 160 can be reduced without compromising the performance by means of stacking the sensor capacitors $C_{sense1}$, $C_{sense2}$ on top of the associated reference capacitors $C_{ref1}$, $C_{ref2}$. In such a concept, an additional middle electrode 124, 144 is introduced, e.g. within a low-pressure cavity 180 (Pcav). In such a way, the reference capacitors $C_{ref1}$, $C_{ref2}$ are not exposed anymore to the ambient pressure $P_{ext}$ and provide a constant capacitance in the entire pressure range. Therefore, this concept helps in saving area without affecting or compromising the resulting (relative) pressure sensitivity and pressure non-linearity. FIG. 1b shows a listing of the resulting parameters and associated scale-down factors of the capacitive MEMS pressure sensor arrangement according to an embodiment. A changed scale-down factor (compared to a factor=1) indicates an equivalently improved technical parameter (operating parameter) of the capacitive MEMS pressure sensor arrangement 100.

FIG. 1c shows a schematic cross-sectional view of the first and second MEMS pressure sensing portion 120, 140, respectively, according to a technical implementation of the capacitive MEMS pressure sensor arrangement 100.

As shown in FIG. 1c, the first/second MEMS pressure sensing portion 120, 140 comprises the first rigid electrode 122, 142, the second rigid electrode 124, 144 and the deflectable membrane structure 126, 146. The terms "electrode" and "structure" are intended to illustrate that the rigid electrodes and the membrane structure, respectively, can comprise a conductive or semi-conductive material or layer or, alternatively, a layer sequence or layer stack having a plurality of different layers, wherein at least one of the layers is electrically semi-conductive or conductive. The electrode and membrane structures 122, 124, 126, and 142, 144, 146 of first and second MEMS pressure sensing portions 120, 140, respectively, may comprise at least one of a conductive metal layer and a conductive semiconductor layer (e.g., a conductive poly-silicon layer).

As exemplarily shown in FIG. 1c, the layer arrangement of the first/second MEMS pressure sensing portion 120, 140 may be positioned on the carrier substrate 160, wherein the first rigid electrode 122, 142 and the second rigid electrode 124, 144 and the membrane structure 126, 146 of the first/second MEMS pressure sensing portions 120, 140 are separated and spaced apart from each other by means of an insulating material structure 150 which mechanically couples (or clamps) the border region of the respective layers with the carrier substrate 160. The non-clamped region of the membrane structure 126, 146 is referred to as the deflectable or moveable region 126-1, 146-1 of the deflectable membrane structure 126, 146.

As exemplarily shown In FIG. 1c, a further insulating layer 152 (e.g., an oxide or nitride layer) may be arranged between the first rigid electrode structure 122, 142 of the first/second MEMS pressure sensing portion 120, 140 and the carrier substrate 160. The further insulating layer 152 may comprise the same insulating material as the insulating material structure 150.

The arrangement of the top cavity (between the second rigid electrode 124, 144 and the membrane structure 126, 146) on top of the bottom cavity (between the first rigid electrode 122, 142 and the second rigid electrode 124, 144), and the arrangement of the bottom cavity (between the first rigid electrode 122, 142 and the second rigid electrode 124, 144) without a pillar 170 therein enables good matching of the capacitances of the sensor capacitors $C_{sense1}$, $C_{sense2}$ and the reference capacitors $C_{ref1}$, $C_{ref2}$. The sensor capacitors $C_{sense1}$, $C_{sense2}$ and the reference capacitors $C_{ref1}$, $C_{ref2}$ (sensor- and reference device) can react on mechanical stresses with similar response, thus the impact of mechanical stress can (at least) partially be eliminated.

According to the embodiment of FIG. 1a, the first rigid electrode 122, 142 of the first and second MEMs pressure sensing portion 120, 140 may be (optionally) mechanically coupled by means of an insulating pillar (or column) 170 (or a plurality of insulating pillars or columns 170) to the second rigid electrode 124, 144 of the first and second MEMS pressure sensing portion 120, 140, respectively. As shown in FIG. 1a, the deflectable portion 126-1, 146-1 of the membrane structure 126, 146 of the first and second MEMS pressure sensing portion 120, 140 is mechanically decoupled from the first and the second rigid electrodes 122, 124, 142, 144 of the first and second MEMS pressure sensing portions 120, 140.

FIG. 1d shows a schematic cross-sectional view of the first and second MEMS pressure sensing portion 120, 140, respectively, according to a further technical implementation of the capacitive MEMS pressure sensor arrangement 100. When compared to the technical implementation of FIG. 1c, the first, second MEMS pressure sensing portion 120, 140 of FIG. 1d additionally comprises the insulating pillar(s) or column(s) 170 to mechanically couple the first and second rigid electrodes 122, 124 of the first MEMS pressure sensing portion 120 and the respective first and second rigid electrodes 142, 144 of the second MEMS pressure sensing portion 140. As exemplarily shown in FIG. 1d, the insulating pillar 170 may comprise the same insulating material 150 as the insulating material structure 150 for mechanically coupling the border regions of the first and second rigid electrodes 122, 124, 142, 144 and of the deflectable membrane structure 126, 146 to the carrier substrate 160.

The arrangement of the bottom cavity (between the first rigid electrode 122, 142 and the second rigid electrode 124, 144) with a pillar 170 therein will achieve no movement of the second rigid electrode 124, 144 (=stator) in all load situations. This can potentially lead to a reduced temperature coefficient of the capacitive MEMS pressure sensor arrangement 100 (pressure device).

According to an embodiment, a cavity 180 underneath the deflectable membrane 126 of the first MEMS pressure sensing portion 120 and a cavity 180 underneath the deflectable membrane 146 of the second MEMS pressure sensing portion 140 are sealed against the environment.

Thus, the cavity 180 between the deflectable membrane 126, 146 and the first rigid electrode 122, 142 of the first MEMS pressure sensing portion 120 and of the second MEMS pressure sensing portion 140 is sealed against the environment. The "sealed cavity" 180 is all the space between the deflectable membrane 126, 146 at the top side and the bottom rigid electrode 122, 142 of first and second MEMS pressure sensing portion 120, 140. In other words, in each MEMS pressure sensing portion 120, 140, both rigid electrodes 122, 124 and 142, 142 are enclosed in the sealed cavity 180.

The sealed cavity 180 is formed as an encapsulation structure (or vacuum chamber) enclosing a low atmospheric pressure $P_{cav}$, e.g. a low internal atmospheric pressure, such as a near vacuum condition.

Thus, the sealed cavity 180 may comprise a reduced low atmospheric pressure (vacuum or near vacuum) with an atmospheric pressure of about or below 3 mbar or 1 mbar. The internal atmospheric pressure in the cavity chamber may, therefore, be in a range between 3 mbar and 0.1 mbar. The reduced atmospheric pressure in the vacuum chamber 180 may be achieved based on the process pressure during the deposition of the different layers for forming the first and second MEMS pressure sensing portion 120, 140, such that the cavity chamber 180 has said reduced atmospheric pressure $P_{cav}$. The reduced atmospheric pressure $P_{cav}$ may effect a pre-bending or pre-tensioning of the deflectable membrane structure 126, 146 (vertically) in the direction of the second rigid electrode 124, 144.

According to an embodiment, the deflectable membrane structure 126 of the first MEMS pressure sensing portion 120 and the deflectable membrane structure 146 of the second MEMS pressure sensing portion 140 are arranged on the same plane, e.g. (vertically offset and parallel) with respect to the first main surface region 160-1 of the substrate 160, wherein the first rigid electrode 122 of the first MEMS pressure sensing portion 120 and the first rigid electrode 142 of the second MEMS pressure sensing portion 140 are arranged on the same plane, e.g. (parallel) with respect to the first main surface region 160-1 of the substrate 160, and wherein the second rigid electrode 124 of the first MEMS pressure sensing portion 120 and the second rigid electrode 144 of the second MEMS pressure sensing portion 140 are arranged on the same plane, e.g. (vertically offset and parallel) with respect to the first main surface region 160-1 of the substrate 160.

Based on the described structure and set-up of the capacitive MEMS pressure sensor arrangement 100 according to the present concept, the expense (cost) and complexity of the MEMS manufacturing process for fabricating the capacitive MEMS pressure sensor arrangement 100 can be kept relatively low and fabrication can be easily integrated in existing MEMS manufacturing processes.

According to an embodiment as shown in FIG. 1a, the capacitive MEMS pressure sensor arrangement 100 may comprise a wiring (wire connection) 190 with the wiring elements 190-1, 190-2, 190-3, 190-4 for connecting the capacitors of the sensor arrangement 100 in a bridge configuration, i.e. with a differential capacitive bridge design. As exemplarily shown in FIG. 1a, the sensing capacitor $C_{sense1}$ and the reference capacitor $C_{ref1}$ of the first MEMS pressure sensing portion 120 and the sensing capacitor $C_{sense2}$ and the reference capacitor $C_{ref2}$ of the first MEMS pressure sensing portion 140 are connected in a bridge configuration, e.g. a Wheatstone bridge.

FIG. 1e shows an equivalent circuit in form of a bridge circuit (Wheatstone bridge) of the capacitive MEMS pressure sensor arrangement 100 according to an embodiment. Thus, FIGS. 1a-1e show a capacitors stacking concept for a capacitive bridge implementation. The capacitive bridge implementation allows to cancel out common mode effects. The arrangement of the first and second rigid electrodes (stators) 122, 124 and 142, 144 results in small parasitic effects to ground.

Figure 2A:
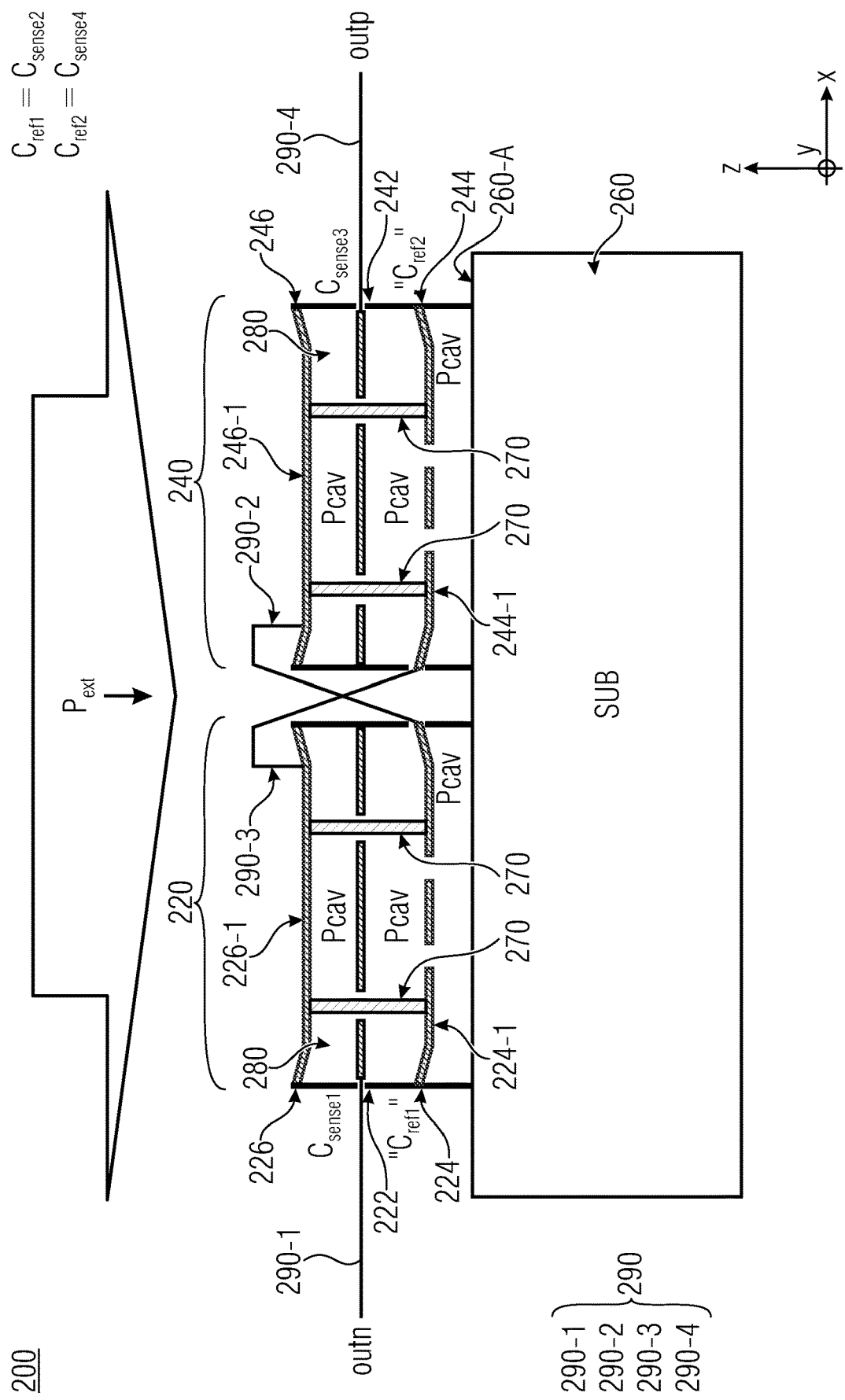
FIGS. 2a-2d show a schematic cross-sectional view of a capacitive MEMS pressure sensor arrangement according to a further embodiment, a listing of the resulting parameters of the capacitive MEMS pressure sensor arrangement, a possible technical implementation of the capacitive MEMS pressure sensor arrangement, and an equivalent circuit in form of a bridge circuit (Wheatstone bridge)
Figures 2B, 2C:
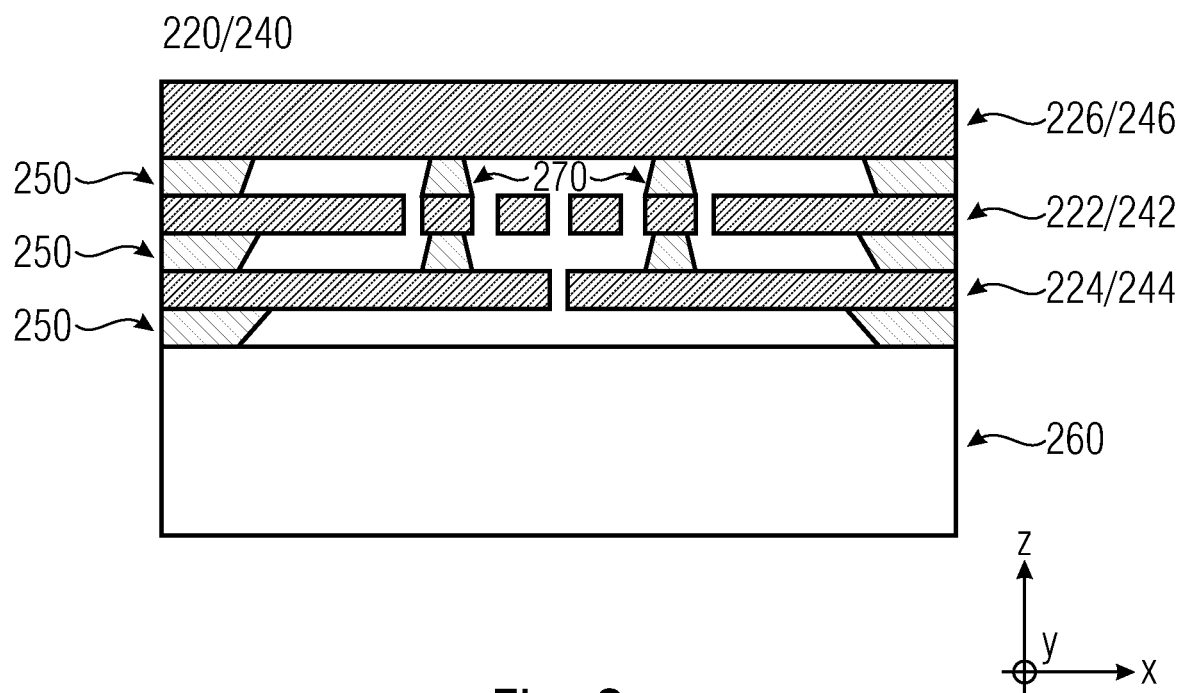
Figure 2D:
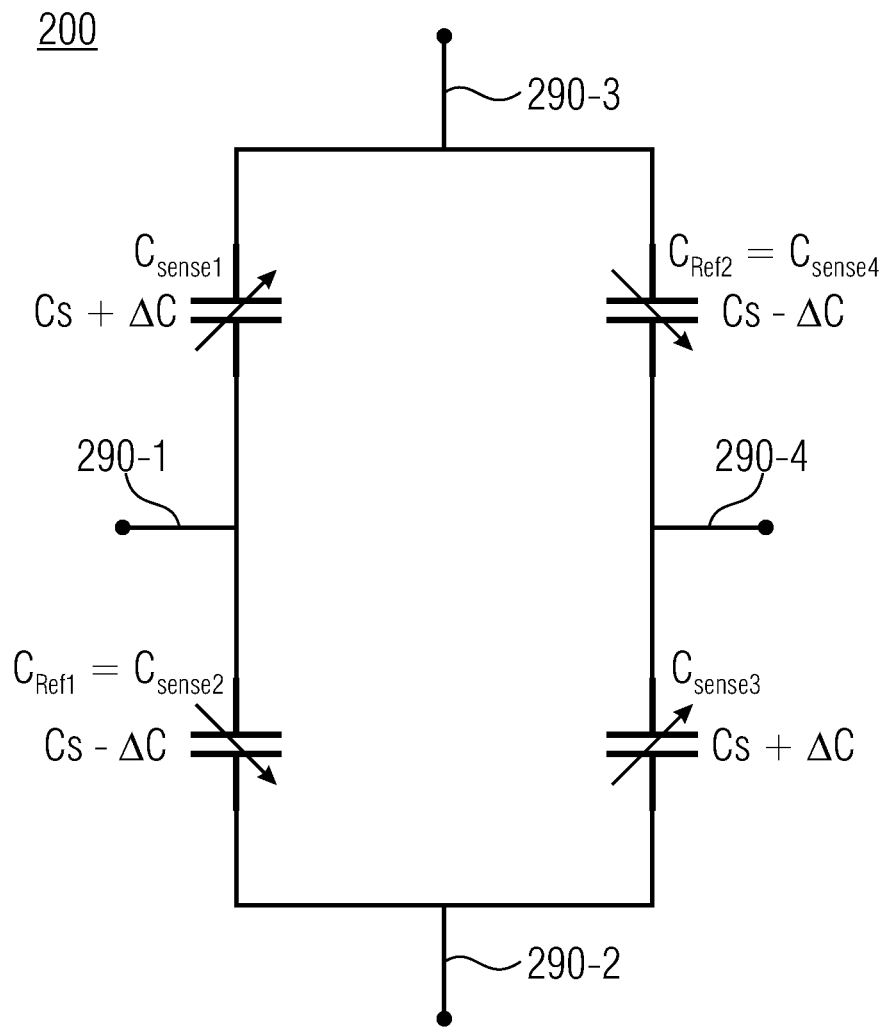

FIG. 2a shows a schematic cross-sectional view of a capacitive (MEMS) pressure sensor arrangement 200 according to a further embodiment. FIG. 2b shows a listing of the resulting parameters (technical parameters) of the capacitive MEMS pressure sensor arrangement 200. FIG. 2c shows a possible technical implementation of the capacitive MEMS pressure sensor arrangement 200. FIG. 2d shows an equivalent circuit in form of a bridge circuit (Wheatstone bridge) of the capacitive MEMS pressure sensor arrangement 200.

The schematic cross-sectionals views of the pressure sensor arrangement 200 in FIGS. 2a and 2c are parallel to the x-y-plane (=vertical plane).

According to the further embodiment as shown in FIGS. 2a-2d, the capacitive pressure sensor arrangement 200 (capacitive MEMS pressure sensor arrangement–

MEMS=microelectromechanical system) comprises a first MEMS pressure sensing portion 220 and a second MEMS pressure sensing portion 240 on a substrate 260. As shown in FIG. 2a (and in FIG. 2c), the first and second MEMS pressure sensing portions 220, 240 may be arranged laterally separated and spaced to each other on the substrate 260.

The first MEMS pressure sensing portion 220 comprises a rigid electrode layer 222 (in form of a conductive layer or layer structure), a first deflectable membrane structure 224 (in form of a conductive layer or layer structure) and a second deflectable membrane structure 226 (in form of a conductive layer or layer structure) in a vertically spaced (and separated) configuration. The rigid electrode layer 222 (counter electrode) is sandwiched between the first deflectable membrane structure 224 and the second deflectable membrane structure 226. The second deflectable membrane structure 226 may be exposed to the environmental atmosphere, i.e. the external pressure $P_{ext}$. The rigid (stiff) electrode layer 222, the first deflectable membrane structure 224 and the second deflectable membrane structure 226 are arranged in a vertically spaced, e.g. in vertically separated and spaced (stacked) configuration.

The second MEMS pressure sensing portion 222 comprises a rigid electrode layer 242 (in form of a conductive layer or layer structure), a first deflectable membrane structure 244 (in form of a conductive layer or layer structure) and a second deflectable membrane structure 246 (in form of a conductive layer or layer structure) in a vertically spaced (and separated) configuration. The rigid electrode layer 242 (counter electrode) is sandwiched between the first deflectable membrane structure 244 and the second deflectable membrane structure 246. The second deflectable membrane structure 246 may be exposed to the environmental atmosphere, i.e., the external pressure $P_{ext}$. The rigid (stiff) electrode layer 242, the first deflectable membrane structure 244 and the second deflectable membrane structure 246 are arranged in a vertically spaced, e.g. in vertically separated and spaced (stacked) configuration.

Thus, according to the embodiment of the capacitive pressure sensor arrangement 200 in FIG. 2a, each of the first and second MEMS pressure sensing portions 220, 240, which are laterally spaced to each other on the substrate 260, comprise the rigid electrode layer 222, 242, the first deflectable membrane structure 224, 244, and the second deflectable membrane structure 226, 246 in a vertically spaced configuration, wherein the rigid electrode layer 222, 224 is sandwiched between the first deflectable membrane structure 224, 244 and the second deflectable structure 226, 246.

According to the embodiment of FIG. 2a, the first deflectable membrane structure 224 of the first MEMS pressure sensing portion 220 comprises a deflectable portion 224-1 and the second deflectable membrane structure 226 of the first MEMS pressure sensing portion 220 comprises a deflectable portion 226-1, and wherein the deflectable portions 224-1, 226-1 of the first and second membrane structure 224, 226 of the first MEMS pressure sensing portion 220 are mechanically coupled (e.g., through an insulating pillar or pillars 270) to each other and are mechanically decoupled from the rigid electrode structure 222.

According to the embodiment of FIG. 2a, the first deflectable membrane structure 244 of the second MEMS pressure sensing portion 240 comprises a deflectable portion 244-1 and the second deflectable membrane structure 246 of the second MEMS pressure sensing portion 240 comprises a deflectable portion 246-1, and wherein the deflectable portions 244-1, 246-1 of the first and second membrane structure 244, 246 of the second MEMS pressure sensing portion 240 are mechanically coupled (e.g., through an insulating pillar or pillars 270) to each other and are mechanically decoupled from the rigid electrode structure 242.

According to the embodiment of FIG. 2a, the first deflectable membrane structure 224 and the first rigid electrode structure 222 of the first MEMS pressure sensing portion 220 form a first sensing capacitor $C_{sense1}$, wherein the first rigid electrode structure 222 and the second deflectable membrane structure 226 of the first MEMS pressure sensing portion 220 form a second sensing capacitor $C_{sense2}$. Further, the first deflectable membrane structure 244 and the first rigid electrode structure 242 of the second MEMS pressure sensing portion 240 form a third sensing capacitor $C_{sense3}$, wherein the first rigid electrode structure 242 and the second deflectable membrane structure 246 of the second MEMS pressure sensing portion 240 form a fourth sensing capacitor $C_{sense4}$.

According to the embodiment of the capacitive MEMS pressure sensor arrangement 200 in FIG. 2a, the first and second MEMS pressure sensing portion 220, 240 each comprise pillars 270, which extend through the top cavity (between the rigid electrode 222 and the second membrane structure 226) and the middle cavity (between the rigid electrode 222 and the first membrane structure 224) to mechanically connect the top membrane 226 with bottom membrane 224. The rigid electrode 222 (stator) between the top membrane 226 and bottom membrane 224 is not connected to the top and bottom membrane 226, 224, thus they can bend relative to the stator 222.

According to the embodiment of the capacitive MEMS pressure sensor arrangement 200 in FIG. 2a, the necessary area (footprint) of the capacitive MEMS pressure sensor arrangement 200 on the substrate 260 can be kept low (or can even be reduced) without compromising the performance by means of stacking the sensor capacitors $C_{sense1}$ and $C_{sense2}$ of the first MEMS pressure sensing portion 220 on top of each other and by means of stacking the sensor capacitors $C_{sense3}$ and $C_{sense4}$ the second MEMS pressure sensing portion 240 on top of each other.

According to the embodiment of the capacitive MEMS pressure sensor arrangement 200 in FIG. 2a, the (relative) sensitivity over the pressure (=the external pressure $P_{ext}$ to be detected) can be further increased by means of (1.) extending the pressure cavity 280 below the bottom electrode (=first deflectable membrane structure 224, 244) and (2.) by means of mechanically linking the top membrane electrode (second deflectable membrane structure 226, 246) with the bottom electrode (first deflectable membrane structure 224, 244) in order to form a dual membrane (dual membrane arrangement) of the first and second MEMS pressure sensing portion 220, 240.

In such a case, since the bottom electrode (first deflectable membrane structure 224, 244) becomes movable, the "reference capacitors $C_{ref}$" (=now the sense capacitors $C_{sense1}$, $C_{sense3}$) will no longer be constant over the pressure change but will vary as well with a 180° phase difference (when compared to the sense capacitors $C_{sense2}$, $C_{sense4}$ over the pressure change). Therefore, the present concept for the capacitive pressure sensor arrangement 200 replaces the two reference capacitors $C_{ref1}$, $C_{ref2}$ of FIGS. 1a-e with two additional sensing capacitors (=$C_{sense1}$, $C_{sense3}$ in FIG. 2a) for providing the four sensing capacitors $C_{sense1}$, $C_{sense2}$, $C_{sense3}$ and $C_{sense4}$ of the capacitive pressure sensor arrangement 200. That will ideally double the total sensitivity of the capacitive pressure sensor arrangement 200 over the pressure $P_{ext}$ to be sensed.

An additional benefit is that the intrinsic electrostatic non-linearity of the resulting capacitive pressure sensor arrangement 200 can now be significantly reduced (up to a 5× reduction) due to the fully differential approach, which can be applied to the sensor arrangement 200.

Thus, FIG. 2a shows an effective capacitor stacking concept with fully differential sensing.

Therefore, the concept for the capacitive pressure sensor arrangement according to FIG. 2a helps in saving area and additionally improving the resulting (relative pressure) sensitivity and pressure non-linearity. FIG. 2b shows a listing of the resulting parameters (technical parameters) and the associated scale-down factors of the capacitive MEMS pressure sensor arrangement 200 according to the further embodiment. A changed scale-down factor (compared to a factor=1) indicates an equivalently improved operating parameter of the capacitive MEMS pressure sensor arrangement 200.

FIG. 2c shows a schematic cross-sectional view of the first, second MEMS pressure sensing portion 220, 240, respectively, according to a technical implementation of the capacitive MEMS pressure sensor arrangement 200.

As shown in FIG. 2C, the first, second MEMS pressure sensor portion 220, 240 comprises the rigid electrode layer 222, 242, the first deflectable membrane structure 224, 244, and the second deflectable membrane structure 226, 246, in a vertically spaced configuration. The terms "layer" and "structure" are intended to illustrate that the rigid electrode and the deflectable membrane structures, respectively, can comprise a conductive or semi-conductive material or layer or, alternatively, a layer sequence or a layer stack having a plurality of different layers, wherein at least one of the layers is electrically semi-conductive or conductive. The respective layers and structures of the first and second MEMS pressure-sensing portion 220, 240 may comprise at least one of a conductive metal layer and a conductive semi-conductor layer, e.g., a conductive poly-silicone layer.

As exemplarily shown in FIG. 2c, the layer arrangement of the first, second MEMS pressure sensing portions 220, 240 may be positioned on the carrier substrate 260, wherein the rigid layers (rigid electrodes) 122, 222 and the first and second deflectable membrane structures 224, 244, and 226, 246 of the first, second MEMS pressure sensing portions 220, 240 are separated and spaced apart from each other by means of an insulating material structure 250 which mechanically couples (or clamps) the border regions of the respective layers with each other and to the carrier substrate 260. The non-clamped regions of the deflectable membrane structures 224, 226 and 244, 246 are referred to as the deflectable or moveable regions 224-1, 226-1 and 244-1, 246-1 of the deflectable membrane structures 224, 244 and 226, 246. The insulating material structure 250 may comprise an oxide or nitride material.

According to an embodiment, the first and second deflectable membrane structure 224, 226 and 244, 246 of the first and second MEMS pressure sensing portion 220, 240 is mechanically coupled by means of an insulating pillar or column 270 (or a plurality of insulating pillars or columns 270) to each other. as shown in FIG. 2a and FIG. 2c, the rigid electrode layer 222, 242 of the first, second MEMS pressure sensing portion 220, 240 is mechanically decoupled from the deflectable portions 224-1, 226-1 and 244-1, 246-1 of the first and second deflectable membrane structures 224, 226 and 244, 246 of the first, second MEMS pressure sensing portions 220, 240. As exemplarily shown in FIG. 2c, the insulating pillar(s) and column(s) 270 may comprise the same insulating material as the insulating material structure 250 for mechanically coupling the border regions of the rigid electrode layer 222 and 242 and the deflectable membrane structures 224, 226 and 244, 246 to the carrier substrate 260.

According to an embodiment, a cavity 280 underneath the second deflectable membrane 226 of the first MEMS pressure sensing portion 220 and a cavity 280 underneath the second deflectable membrane 246 of the second MEMS pressure sensing portion 240 are sealed against the environment. Thus, the cavity 280 between the deflectable membrane 226, 246 and of the substrate of the first, second MEMS pressure sensing portion 220, 240 is sealed against the environment. The "sealed cavity" is all the space between the deflectable membrane 226, 246 at the top and the substrate 260 at the bottom. In other words, in each MEMS pressure sensing portion 220, 240, both first rigid electrode and the first deflectable membrane are enclosed in the sealed cavity.

The sealed cavity 280 is formed as an encapsulation structure (or vacuum chamber) enclosing a low atmospheric pressure $P_{cav}$, e.g. a low internal atmospheric pressure, such as a near vacuum condition.

Thus, the sealed cavity 280 may comprise a reduced low atmospheric pressure (vacuum or near vacuum) with an atmospheric pressure of about or below 3 mbar or 1 mbar. The internal atmospheric pressure in the cavity chamber may, therefore, be in a range between 3 mbar and 0.1 mbar. The reduced atmospheric pressure in the vacuum chamber 280 may be achieved based on the process pressure during the deposition of the different layers for forming the first and second MEMS pressure sensing portion 220, 240, such that the cavity chamber 180 has said reduced atmospheric pressure $P_{cav}$.

The reduced atmospheric pressure $P_{cav}$ may effect a pre-bending or pre-tensioning of the first and second deflectable membrane structure 226, 246 (vertically) in the direction of the substrate 260.

According to an embodiment, the first deflectable membrane structure 224 of the first MEMS pressure sensing portion 220 and the first deflectable membrane structure 244 of the second MEMS pressure sensing portion 240 are arranged on the same plane, e.g. (vertically offset and parallel) with respect to the first main surface region of the substrate, wherein the second deflectable membrane structure 226 of the first MEMS pressure sensing portion 220 and the second deflectable membrane structure 246 of the second MEMS pressure sensing portion 246 are arranged on the same plane, e.g. (vertically offset and parallel) with respect to the first main surface region of the substrate, and wherein the rigid electrode 222 of the first MEMS pressure sensing portion 220 and the rigid electrode 242 of the second MEMS pressure sensing portion 240 are arranged on the same plane, e.g. (vertically offset and parallel) with respect to the first main surface region 260-A of the substrate 260.

Based on the described structure and set-up of the capacitive MEMS pressure sensor arrangement 200 according to the present concept, the expense (cost) and complexity of the MEMS manufacturing process for fabricating the capacitive MEMS pressure sensor arrangement 200 can be kept relatively low and fabrication can be easily integrated in existing MEMS manufacturing processes.

According to an embodiment as shown in FIG. 2a, the capacitive MEMS pressure sensor arrangement 200 may comprise a wiring (wire connection) 290 with the wiring elements 290-1, 290-2, 290-3, 290-4 for connecting the capacitors of the sensor arrangement 200 in a bridge configuration, i.e. with a differential capacitive bridge design.

According to an embodiment, the first sensing capacitor $C_{sense1}$, the second sensing capacitor $C_{sense2}$, the third sensing capacitor $C_{sense3}$ and the fourth sensing capacitor $C_{sense4}$ are connected in a bridge configuration (e.g., a Wheatstone bridge). According to an embodiment, the first to fourth sensing capacitors $C_{sense1}$, $C_{sense2}$, $C_{sense3}$, $C_{sense4}$ are connected in a fully differential sensing configuration.

FIG. 2d shows an equivalent circuit in form of a bridge circuit (Wheatstone bridge) of the capacitive MEMS pressure sensor arrangement 200 according to an embodiment.

Figure 3A:
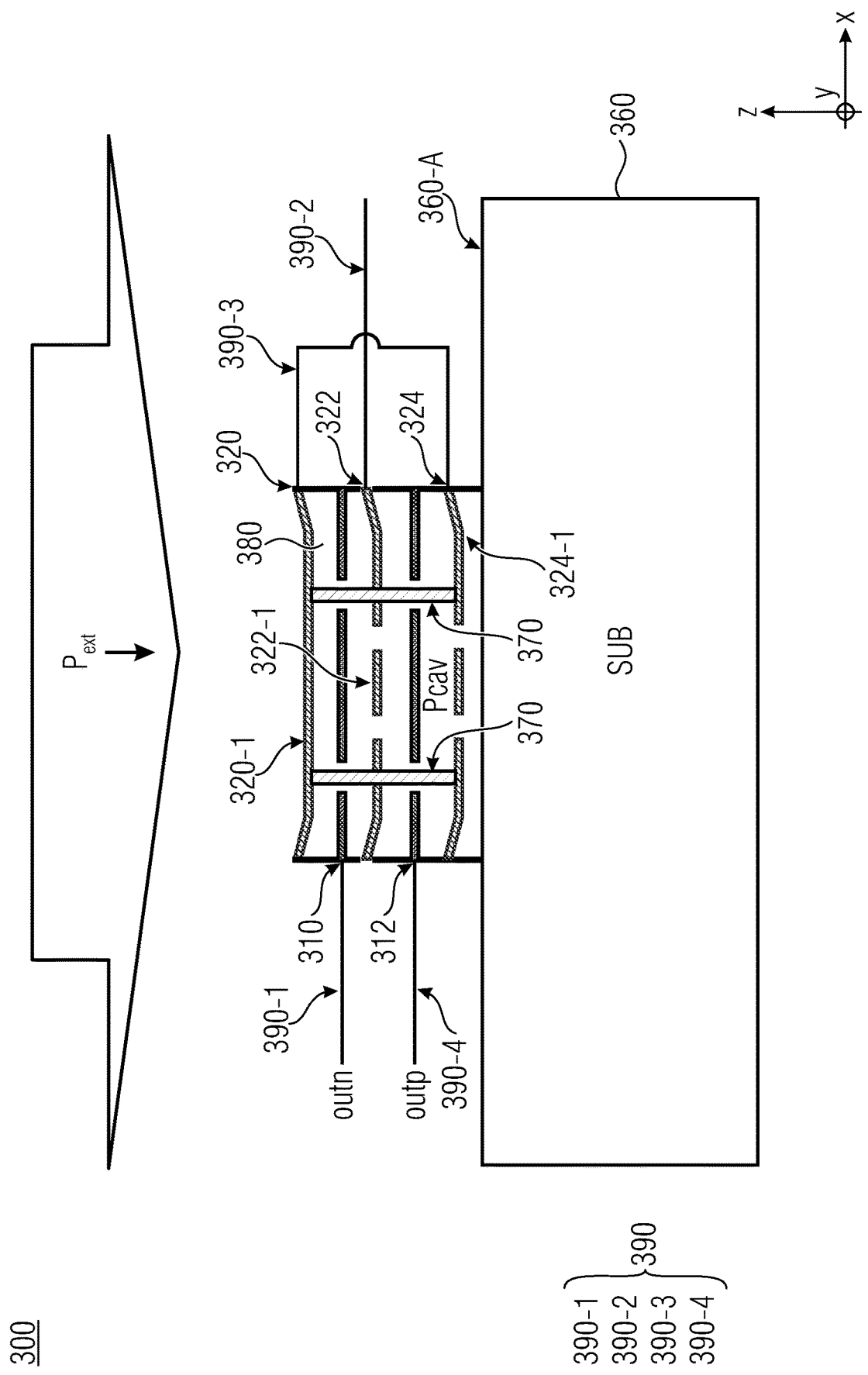
FIGS. 3a-3c show a schematic cross-sectional view of a capacitive MEMS pressure sensor arrangement according to a further embodiment, a listing of the resulting parameters of the capacitive MEMS pressure sensor arrangement, and an equivalent circuit in form of a bridge circuit (Wheatstone bridge).
Figures 3B, 3C:
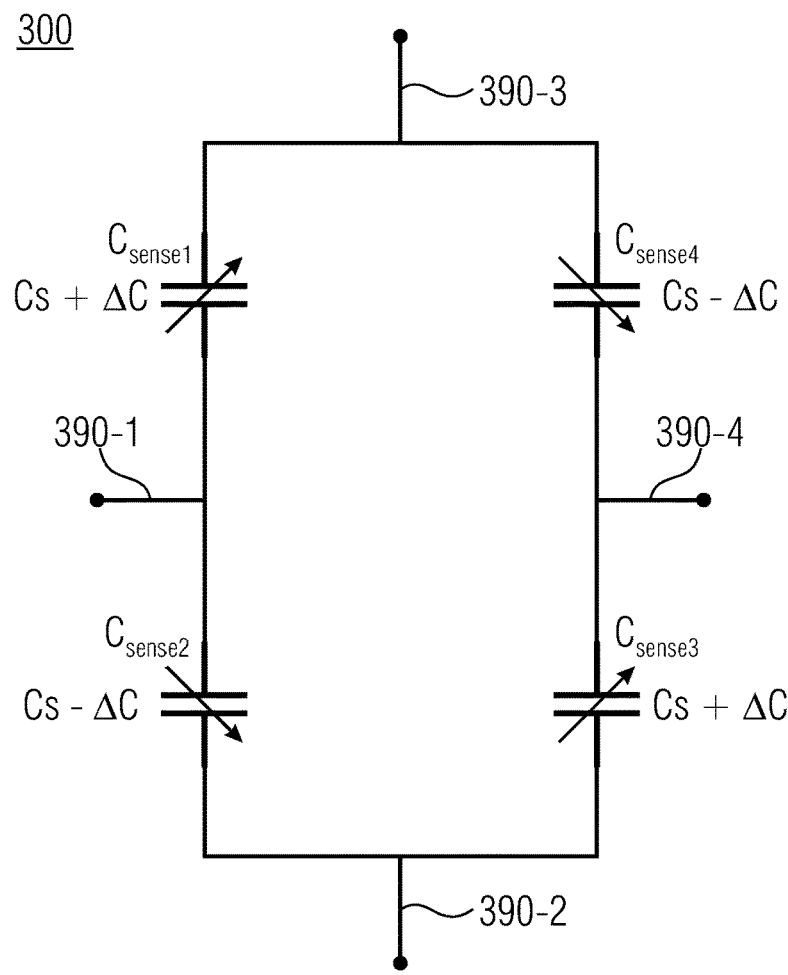

FIG. 3a shows a schematic cross-sectional view of a capacitive (MEMS) pressure sensor arrangement 300 according to a further embodiment. FIG. 3b shows a listing of the resulting parameters (technical parameters) of the capacitive MEMS pressure sensor arrangement 300. FIG. 3c shows an equivalent circuit in form of a bridge circuit (Wheatstone bridge) of the capacitive MEMS pressure sensor arrangement 200. FIGS. 3a-3c show an optimized capacitor stacking concept with fully differential pressure sensing for area or sensitivity improvement.

The schematic cross-sectionals views of the pressure sensor arrangement 300 in FIG. 3a is parallel to the x-y-plane (=vertical plane).

According to the further embodiment as shown in FIGS. 3a-3c, the capacitive (MEMS) pressure sensor arrangement 300 comprises a first rigid electrode structure 310, a second rigid electrode structure 312, a first deflectable membrane structure 320, a second deflectable membrane structure 322 and a third deflectable membrane structure 324 in a vertically spaced configuration, e.g. in vertically separated and spaced (stacked) configuration. The first deflectable membrane structure 320 may be exposed to the environmental atmosphere, i.e., the external pressure $P_{ext}$.

The first rigid electrode structure 310 is sandwiched between the first and second deflectable membrane structure 320, 322, wherein the second rigid electrode structure 312 is sandwiched between the second and third deflectable membrane structure 322, 324. The first deflectable membrane structure 320 comprises a deflectable portion 320-1, the second deflectable membrane structure 322 comprises a deflectable portion 322-1, and the third deflectable membrane structure 324 comprises a deflectable portion 324-1. Thus, the first, second and third deflectable membrane structures 320, 322, 324 each comprise a deflectable portion 320-1, 322-1, 324-1, wherein the deflectable portions 320-1, 322-1, 324-1 of the first, second and third deflectable membrane elements 320, 322, 324 are mechanically coupled to each other, e.g. by means of insulating pillars 370, and are mechanically decoupled from the first and second rigid electrode structures 310, 312.

The first deflectable membrane structure 320 and the first rigid electrode structure 310 form a first sensing capacitor (capacitive element) $C_{sense1}$, wherein the first rigid electrode structure 310 and the second deflectable membrane structure 322 form a second sensing capacitor $C_{sense2}$, wherein the second deflectable membrane structure 322 and the second rigid electrode structure 312 form a third sensing capacitor $C_{sense3}$, and wherein the second rigid electrode structure 312 and the third deflectable membrane structure 324 form a fourth sensing capacitor $C_{sense4}$.

According to the embodiment of the capacitive MEMS pressure sensor arrangement 300 in FIG. 3a, pillars 370 extend in the cavity 380 between the first membrane structure 320 and the third membrane structure 324, to mechanically connect (the respective deflectable portions 320-1, 320-2, 320-3 of) the first, second and third membrane structure to each other, wherein the first and second rigid electrodes 310, 312 (stators) are not connected to (the respective deflectable portions 320-1, 320-2, 320-3 of) the membrane structures 320, 322, 324, thus they can bend relative to the stators 310, 312.

According to the embodiment of the capacitive MEMS pressure sensor arrangement 300 in FIG. 3a, the necessary area (footprint) of the capacitive MEMS pressure sensor arrangement 300 on the substrate 360 can be kept low (or can even be reduced) without compromising the performance by means of stacking the sensor capacitors $C_{sense1}$ . . . $C_{sense4}$ on top of each other.

According to the embodiment of the capacitive MEMS pressure sensor arrangement 200 in FIG. 3a, the (relative) sensitivity over the pressure (=the external pressure $P_{ext}$ to be detected) can be further increased by means of (1.) extending the pressure cavity 380 below the bottom electrode (=third deflectable membrane structure 324) and (2.) by means of mechanically linking the membrane electrodes 320, 322, 324 in order to form a triple membrane (triple membrane arrangement).

In such a case, the present concept for the capacitive pressure sensor arrangement 300 provides the four sensing capacitors $C_{sense1}$, $C_{sense2}$, $C_{sense3}$ and $C_{sense4}$. That will increase the total sensitivity of the capacitive pressure sensor arrangement 300 over the pressure $P_{ext}$ to be sensed. An additional benefit is that the intrinsic electrostatic non-linearity of the resulting capacitive pressure sensor arrangement 300 can be significantly reduced (up to a 5× reduction) due to the fully differential approach, which can be applied to the sensor arrangement 300. Thus, FIG. 3a shows an effective capacitor stacking concept with fully differential sensing.

Therefore, the concept for the capacitive pressure sensor arrangement according to FIG. 3a helps in saving area and additionally improving the resulting (relative pressure) sensitivity and pressure non-linearity. FIG. 3b shows a listing of the resulting parameters (technical parameters) and the associated scale-down factors of the capacitive MEMS pressure sensor arrangement 300 according to the further embodiment. A changed scale-down factor (compared to a factor=1) indicates an equivalently improved operating parameter of the capacitive MEMS pressure sensor arrangement 300.

Further improvements with respect to the sensor arrangement 200 of FIG. 2a-2d can be achieved, if 2 additional electrodes are introduced within the cavity 380 as shown in FIG. 3a.

In such case there are 2 possible improvements, as shown in FIG. 3b:

Assuming the same area as in the FIGS. 2a-2d concept, the pressure sensitivity can be ideally increased up to 2× more (4× more compared to the state of the art), and Assuming the same pressure sensitivity, the area can be reduced by half compared to the FIGS. 2a-2d concept.

According to an embodiment, a cavity 380 underneath the first deflectable membrane 320 is sealed against the environment. Thus, the cavity 380 between the first deflectable membrane 320 and of the substrate 360 is sealed against the environment.

The sealed cavity 380 is formed as an encapsulation structure (or vacuum chamber) enclosing a low atmospheric pressure $P_{cav}$, e.g. a low internal atmospheric pressure, such as a near vacuum condition.

Thus, the sealed cavity 380 may comprise a reduced low atmospheric pressure (vacuum or near vacuum) with an atmospheric pressure of about or below 3 mbar or 1 mbar. The internal atmospheric pressure in the cavity chamber may, therefore, be in a range between 3 mbar and 0.1 mbar. The reduced atmospheric pressure in the vacuum chamber 380 may be achieved based on the process pressure during the deposition of the different layers for forming the sensor arrangement 300, such that the cavity chamber 180 has said reduced atmospheric pressure $P_{cav}$. The reduced atmospheric pressure $P_{cav}$ may effect a pre-bending or pre-tensioning of the first to third deflectable membrane structure 320, 322, 324 (vertically) in the direction of the substrate 360.

According to an embodiment as shown in FIG. 3a, the capacitive MEMS pressure sensor arrangement 300 may comprise a wiring (wire connection) 390 with the wiring elements 390-1, 390-2, 390-3, 390-4 for connecting the capacitors of the sensor arrangement 300 in a bridge configuration, i.e. with a differential capacitive bridge design.

According to an embodiment, the first sensing capacitor $C_{sense3}$, the second sensing capacitor $C_{sense3}$, the third sensing capacitor $C_{sense3}$ and the fourth sensing capacitor $C_{sense3}$ are connected in a bridge configuration (e.g., a Wheatstone bridge).

According to an embodiment, the first to fourth sensing capacitors $C_{sense1}$, $C_{sense2}$, $C_{sense3}$, $C_{sense4}$ are connected in a fully differential sensing configuration.

FIG. 3c shows an equivalent circuit in form of a bridge circuit (Wheatstone bridge) of the capacitive MEMS pressure sensor arrangement 300 having the first to fourth sensing capacitors $C_{sense1}$, $C_{sense2}$, $C_{sense3}$, $C_{sense4}$ and the wiring 390 according to an embodiment.

In the following, some (common) technical aspects and effects of the above-described embodiments of the capacitive (MEMS) pressure sensor arrangement 100, 200, 300 are summarized.

In the context of the description of the different embodiments, the term rigid generally refers to a mechanically rigid, inflexible or stiff property (material property) of an element (e.g., a rigid layer or layer structure), wherein the term deflectable generally refers to a mechanically deflectable, movable, flexible, elastic or bendable property (material property) of an element (e.g., with respect to a vertical deflection of a layer or layer structure).

Typical Dimensions for the different MEMS capacitor layers: The deflectable membrane structures may have a lateral dimension of about 50 to 1000 μm and a thickness of about 0, 2 to 1 μm, the rigid electrodes may have a lateral dimension of about 50 to 1000 μm and a thickness of about 0, 2 to 1 μm, the vertical gap (spacing in a rest (=not-deflected) condition) between the opposing layers (rigid electrodes—deflectable membranes) may be about 150 to 300 nm. The deflectable "top" membrane ($P_{ext}$) 1, 5 to 3 times or about 2 times thicker than the further layers and electrodes.

The core idea capacitive (MEMS) pressure sensor arrangement 100, 200, 300 (for front side sensing) can be described as follows:
1) Stacking of the sensor capacitors on top of the reference capacitors;
   AND
2) The extended the pressure cavity below the bottom electrode;
   AND
3) The mechanical link of:
   A the top membrane with the bottom electrode in order to form a dual membrane;

OR
   B. The mechanical link of the top membrane, the bottom electrode and an intermediate electrode within the cavity.

The present sensor concept is related to a capacitive pressure sensor that shows advantages in terms of pressure sensitivity, pressure nonlinearity and the necessary area to achieve so. The sensor comprises or consists of pressure sensitive capacitors interconnected in such a way to form a bridge. Furthermore, a readout circuit is used to sense the change in capacitance over pressure and temperature.

The overall pressure sensor performance can benefit from the following parameters and/or characteristics:
1) Relative sensitivity defined as the ratio of the relative capacitance change to the nominal capacitance;
2) The linearity of the sensor transfer function in particular the capacitance over pressure response;
3) The fully differential design of a capacitive bridge that reduces common mode effects especially the sensitivity over temperature; and
4) The overall area needed to implement a fully differential design of a capacitive bridge.

The abovementioned parameters and the associated benefits in the system performance are listed in the table below:

| MEMS PARAMETER | Pressure sensor performance |
| --- | --- |
| High Relative Sensitivity (ΔC/C) | Better noise performance |
| Lower Pressure Non-Linearity | Lower Sensitivity Error<br>Lower polynomial order in pressure digital calibration<br>Smaller test time in sensor final calibration |
| Fully differential design | Lower MEMS Temperature Coefficient (TC)<br>Lower polynomial order in temperature digital calibration<br>Lower oversampling over temperature that results in lower current consumption |
| Smaller Area | Better stress decoupling<br>Smaller package form factor<br>Better cost position |

Additional embodiments and aspects are described which may be used alone or in combination with the features and functionalities described herein.

According to an embodiment, a capacitive pressure sensor arrangement comprises a first MEMS pressure sensing portion and a second MEMS pressure sensing portion on a substrate, each comprising: a first rigid electrode fixed with respect to the substrate, a second rigid electrode, and a deflectable membrane structure, wherein the second rigid electrode is sandwiched between the first rigid electrode and the deflectable membrane structure, and wherein the first rigid electrode, the second rigid electrode and the deflectable membrane structure are arranged in a vertically spaced configuration, and
    wherein the first and second rigid electrode of the first MEMS pressure sensing portion form a reference capacitor of the first MEMS pressure sensing portion, and wherein the second rigid electrode and the deflectable membrane structure of the first MEMS pressure sensing portion form a sensing capacitor of the first MEMS pressure sensing portion, and
    wherein the first and second rigid electrode of the second MEMS pressure sensing portion form a reference capacitor of the second MEMS pressure sensing portion, and wherein the second rigid electrode and the deflectable membrane structure of the second MEMS pressure sensing portion form a sensing capacitor of the second MEMS pressure sensing portion.

According to an embodiment, the first rigid electrode is mechanically coupled by means of an insulating pillar to the second rigid electrode.

According to an embodiment, a cavity underneath the deflectable membrane of the first MEMS pressure sensing portion and a cavity underneath the deflectable membrane of the second MEMS pressure sensing portion are sealed against the environment.

According to an embodiment, the deflectable membrane structure of the first MEMS pressure sensing portion and the deflectable membrane structure of the second MEMS pressure sensing portion are arranged on the same plane, wherein the first rigid electrode of the first MEMS pressure sensing portion and the first rigid electrode of the second rigid electrode of the second MEMS pressure sensing portion are arranged on the same plane, and wherein the second rigid electrode of the first MEMS pressure sensing portion and the second rigid electrode of the second rigid electrode of the second MEMS pressure sensing portion are arranged on the same plane.

According to an embodiment, the sensing capacitor and the reference capacitor of the first MEMS pressure sensing portion and the sensing capacitor and the reference capacitor of the second MEMS pressure sensing portion are connected in a bridge configuration.

According to an embodiment, a capacitive pressure sensor arrangement comprises a first MEMS pressure sensing portion and a second MEMS pressure sensing portion on a substrate, each comprising: a rigid electrode structure, a first deflectable membrane structure and a second deflectable membrane structure in a vertically spaced configuration, wherein the rigid electrode structure is sandwiched between the first deflectable membrane structure and the second deflectable membrane structure, and
  wherein the first deflectable membrane structure of the first MEMS pressure sensing portion comprises a deflectable portion and the second deflectable membrane structure of the first MEMS pressure sensing portion comprises a deflectable portion, and wherein the deflectable portions of the first and second membrane structures of the first MEMS pressure sensing portion are mechanically coupled to each other and are mechanically decoupled from the rigid electrode structure,
  wherein the first deflectable membrane structure of the second MEMS pressure sensing portion comprises a deflectable portion and the second deflectable membrane structure of the second MEMS pressure sensing portion comprises a deflectable portion, and wherein the deflectable portions of the first and second membrane structures of the second MEMS pressure sensing portion are mechanically coupled to each other and are mechanically decoupled from the rigid electrode structure,
  wherein the first deflectable membrane structure and the rigid electrode structure of the first MEMS pressure sensing portion form a first sensing capacitor, wherein the first rigid electrode structure and the second deflectable membrane structure of the first MEMS pressure sensing portion form a second sensing capacitor, and
  wherein the first deflectable membrane structure and the rigid electrode structure of the second MEMS pressure sensing portion form a third sensing capacitor, wherein the first rigid electrode structure and the second deflectable membrane structure of the second MEMS pressure sensing portion form a fourth sensing capacitor.

According to an embodiment, a cavity underneath the second deflectable membrane of the first MEMS pressure sensing portion and a cavity underneath the second deflectable membrane of the second MEMS pressure sensing portion are sealed against the environment.

According to an embodiment, the first deflectable membrane structure of the first MEMS pressure sensing portion and the first deflectable membrane structure of the second MEMS pressure sensing portion are arranged on the same plane.

According to an embodiment, the second deflectable membrane structure of the first MEMS pressure sensing portion and the second deflectable membrane structure of the second MEMS pressure sensing portion are arranged on the same plane, and wherein the rigid electrode of the first MEMS pressure sensing portion and the rigid electrode of the second MEMS pressure sensing portion are arranged on the same plane.

According to an embodiment, the first sensing capacitor, the second sensing capacitor, the third sensing capacitor and the fourth sensing capacitor are connected in a bridge configuration.

According to an embodiment, the first to fourth sensing capacitors are connected in a fully differential sensing configuration.

According to an embodiment, a capacitive pressure sensor arrangement comprises a first rigid electrode structure, a second rigid electrode structure, a first deflectable membrane structure, second deflectable membrane structure and third deflectable membrane structure in a vertically spaced configuration,
  wherein the first rigid electrode structure is sandwiched between the first and second deflectable membrane structure, wherein the second rigid electrode structure is sandwiched between the second and third deflectable membrane structure, wherein the first, second and third deflectable membrane structures each comprise a deflectable portion, wherein the deflectable portions of the first, second and third deflectable membrane elements are mechanically coupled to each other and are mechanically decoupled from the first and second rigid electrode structures, and
  wherein the first deflectable membrane structure and the first rigid electrode structure form a first sensing capacitor, wherein the first rigid electrode structure and the second deflectable membrane structure form a second sensing capacitor, wherein the second deflectable membrane structure and the second rigid electrode structure form a third sensing capacitor, and wherein the second rigid electrode structure and the third deflectable membrane structure form a fourth sensing capacitor.

According to an embodiment, a cavity underneath the first deflectable membrane is sealed against the environment.

According to an embodiment, the first sensing capacitor, the second sensing capacitor, the third sensing capacitor and the fourth sensing capacitor are connected in a bridge configuration.

According to an embodiment, the first to fourth sensing capacitors are connected in a fully differential sensing configuration.

Additional embodiments and aspects are described which may be used alone or in combination with the features and functionalities described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A capacitive pressure sensor arrangement comprising:
   a first MEMS pressure sensing portion and a second MEMS pressure sensing portion on a substrate, each comprising:
   a first rigid electrode fixed with respect to the substrate, a second rigid electrode, and a deflectable membrane structure, wherein the second rigid electrode is sandwiched between the first rigid electrode and the deflectable membrane structure, and wherein the first rigid electrode, the second rigid electrode and the deflectable membrane structure are arranged in a vertically spaced configuration, and
   wherein the first and second rigid electrode of the first MEMS pressure sensing portion form a reference capacitor of the first MEMS pressure sensing portion, and wherein the second rigid electrode and the deflectable membrane structure of the first MEMS pressure sensing portion form a sensing capacitor of the first MEMS pressure sensing portion, and
   wherein the first and second rigid electrode of the second MEMS pressure sensing portion form a reference capacitor of the second MEMS pressure sensing portion, and wherein the second rigid electrode and the deflectable membrane structure of the second MEMS pressure sensing portion form a sensing capacitor of the second MEMS pressure sensing portion.

2. The sensor arrangement according to claim 1, wherein the first rigid electrode is mechanically coupled by means of an insulating pillar to the second rigid electrode.

3. The sensor arrangement according to claim 1, wherein a cavity underneath the deflectable membrane of the first MEMS pressure sensing portion and a cavity underneath the deflectable membrane of the second MEMS pressure sensing portion are sealed against the environment.

4. The sensor arrangement according to claim 1, wherein the deflectable membrane structure of the first MEMS pressure sensing portion and the deflectable membrane structure of the second MEMS pressure sensing portion are arranged on the same plane,
   wherein the first rigid electrode of the first MEMS pressure sensing portion and the first rigid electrode of the second rigid electrode of the second MEMS pressure sensing portion are arranged on the same plane, and
   wherein the second rigid electrode of the first MEMS pressure sensing portion and the second rigid electrode of the second rigid electrode of the second MEMS pressure sensing portion are arranged on the same plane.

5. The sensor arrangement according to claim 1, wherein the sensing capacitor and the reference capacitor of the first MEMS pressure sensing portion and the sensing capacitor and the reference capacitor of the second MEMS pressure sensing portion are connected in a bridge configuration.

6. A capacitive pressure sensor arrangement comprising:
   a first MEMS pressure sensing portion and a second MEMS pressure sensing portion on a substrate, each comprising:
   a rigid electrode structure, a first deflectable membrane structure and a second deflectable membrane structure in a vertically spaced configuration, wherein the rigid electrode structure is sandwiched between the first deflectable membrane structure and the second deflectable membrane structure, and
   wherein the first deflectable membrane structure of the first MEMS pressure sensing portion comprises a deflectable portion and the second deflectable membrane structure of the first MEMS pressure sensing portion comprises a deflectable portion, and wherein the deflectable portions of the first and second deflectable membrane structures of the first MEMS pressure sensing portion are mechanically coupled to each other and are mechanically decoupled from the rigid electrode structure,
   wherein the first deflectable membrane structure of the second MEMS pressure sensing portion comprises a deflectable portion and the second deflectable membrane structure of the second MEMS pressure sensing portion comprises a deflectable portion, and wherein the deflectable portions of the first and second deflectable membrane structures of the second MEMS pressure sensing portion are mechanically coupled to each other and are mechanically decoupled from the rigid electrode structure, wherein the first deflectable membrane structure and the rigid electrode structure of the first MEMS pressure sensing portion form a first sensing capacitor, wherein the rigid electrode structure and the second deflectable membrane structure of the first MEMS pressure sensing portion form a second sensing capacitor, wherein the first deflectable membrane structure and the rigid electrode structure of the second MEMS pressure sensing portion form a third sensing capacitor, wherein the rigid electrode structure and the second deflectable membrane structure of the second MEMS pressure sensing portion form a fourth sensing capacitor, and wherein the rigid electrode structure and the second deflectable membrane of the first MEMS pressure sensing portion and the rigid electrode structure and the second deflectable membrane of the second MEMS pressure sensing portion are enclosed in respective sealed cavities.

7. The sensor arrangement according to claim 6, wherein the respective sealed cavities include a cavity underneath the second deflectable membrane of the first MEMS pressure sensing portion and a cavity underneath the second deflectable membrane of the second MEMS pressure sensing portion are sealed against the environment.

8. The sensor arrangement according to claim 6, wherein the first deflectable membrane structure of the first MEMS pressure sensing portion and the first deflectable membrane structure of the second MEMS pressure sensing portion are arranged on the same plane,
wherein the second deflectable membrane structure of the first MEMS pressure sensing portion and the second deflectable membrane structure of the second MEMS pressure sensing portion are arranged on the same plane, and
wherein the rigid electrode of the first MEMS pressure sensing portion and the rigid electrode of the second MEMS pressure sensing portion are arranged on the same plane.

9. The sensor arrangement according to claim 6, wherein the first sensing capacitor, the second sensing capacitor, the third sensing capacitor and the fourth sensing capacitor are connected in a bridge configuration.

10. The sensor arrangement according to claim 6, wherein the first to fourth sensing capacitors are connected in a fully differential sensing configuration.

11. A capacitive pressure sensor arrangement comprising:
a first rigid electrode structure, a second rigid electrode structure, a first deflectable membrane structure, a second deflectable membrane structure and a third deflectable membrane structure in a vertically spaced configuration,
wherein the first rigid electrode structure is sandwiched between the first and second deflectable membrane structure, wherein the second rigid electrode structure is sandwiched between the second and third deflectable membrane structure, wherein the first, second and third deflectable membrane structures each comprise a deflectable portion, wherein the deflectable portions of the first, second and third deflectable membrane structures are mechanically coupled to each other and are mechanically decoupled from the first and second rigid electrode structures,
wherein the first deflectable membrane structure and the first rigid electrode structure form a first sensing capacitor, wherein the first rigid electrode structure and the second deflectable membrane structure form a second sensing capacitor, wherein the second deflectable membrane structure and the second rigid electrode structure form a third sensing capacitor, and wherein the second rigid electrode structure and the third deflectable membrane structure form a fourth sensing capacitor.

12. The sensor arrangement according to claim 11, wherein the first, second and third deflectable membrane structures are mechanically coupled to each other through at least one insulating pillar coupled to deflectable portions of the first, second, and third deflectable membrane structures.

13. The sensor arrangement according to claim 11, wherein the first sensing capacitor, the second sensing capacitor, the third sensing capacitor and the fourth sensing capacitor are connected in a bridge configuration.

14. The sensor arrangement according to claim 11, wherein the first to fourth sensing capacitors are connected in a fully differential sensing configuration.

15. The sensor arrangement according to claim 11, wherein a pressure cavity extends underneath the first deflectable membrane structure, second deflectable membrane structure, and third deflectable membrane structure, the pressure cavity having a pressure that is less than an ambient pressure.

* * * * *